(12) United States Patent
Yamada et al.

(10) Patent No.: US 8,601,684 B2
(45) Date of Patent: Dec. 10, 2013

(54) METHOD OF MANUFACTURING A VEHICLE

(75) Inventors: Mitsuyoshi Yamada, Tokyo (JP); Hirofumi Okazaki, Tokyo (JP); Yoshio Banba, Tokyo (JP)

(73) Assignee: Hino Motors Ltd., Tokyo (JP)

( * ) Notice: Subject to any disclaimer, the term of this patent is extended or adjusted under 35 U.S.C. 154(b) by 1498 days.

(21) Appl. No.: 10/599,405

(22) PCT Filed: Mar. 31, 2005

(86) PCT No.: PCT/JP2005/006277
§ 371 (c)(1),
(2), (4) Date: Feb. 15, 2011

(87) PCT Pub. No.: WO2005/095193
PCT Pub. Date: Oct. 13, 2005

(65) Prior Publication Data
US 2011/0119888 A1    May 26, 2011

(30) Foreign Application Priority Data
Mar. 31, 2004   (JP) ................. 2004-104622
Apr. 2, 2004    (JP) ................. 2004-110095

(51) Int. Cl.
*H01R 43/20*         (2006.01)
(52) U.S. Cl.
USPC ................. 29/876; 29/428; 29/430; 29/897.2
(58) Field of Classification Search
USPC ........ 29/876, 419.2, 428, 430, 700, 787, 795, 29/824, 897.2
See application file for complete search history.

(56) References Cited

U.S. PATENT DOCUMENTS 5,865,362 A * 2/1999 Behrmann et al. ......... 228/114.5

FOREIGN PATENT DOCUMENTS

| JP | 57-49078    | 8/1980  |
| JP | 09/216585   | 8/1987  |
| JP | 6-274501    | 9/1994  |
| JP | 3086318     | 3/2002  |
| JP | 2002-179386 | 6/2002  |
| JP | 2003-525792 | 9/2003  |
| WO | WO 99/65718 | 12/1999 |

OTHER PUBLICATIONS

Japanese Office Action issued on Aug. 5, 2008 for Japanese Application No. 2004-110095.
Japanese Office Action issued on Sep. 30, 2008 for Japanese Application No. 2004-110095.
Supplementary Partial European Search Report for EP 02 75 1825.

* cited by examiner

*Primary Examiner* — Thiem Phan
(74) *Attorney, Agent, or Firm* — Smith, Gambrell & Russell, LLP

(57) ABSTRACT

A manufacturing method for a vehicle capable of reducing man-hours, improving worker posture, and increasing worker efficiency in a step for mounting components on a frame as part of vehicle assembly steps. Some or all components such as tanks, pipes and wires are mounted on a frame 3 before assembling the frame 3. Namely, some or all components are first mounted on side rails, which are elements of the frame 3, and cross members 2 are then assembled to the side rails 1. Side rail holding stands are disposed on a working surface plate to hold a pair of side rails 1 in parallel and at a prescribed height, and in accordance with advancement of work, rotate each of the side rails 1 about a longitudinal axis thereof. Each side rail is rotated hydraulically by a prescribed angle (approximately 90 degrees) about a longitudinal axis thereof.

4 Claims, 4 Drawing Sheets

METHOD OF MANUFACTURING A VEHICLE

TECHNICAL FIELD

The present invention can be put into practice in assembly steps for automobiles and other vehicles. The present invention can be put into practice in mass-production assembly plants for vehicles. The present invention relates to improvement of the assembly procedure for vehicles. Specifically, the present invention can be put into practice in assembly steps for vehicles having a frame formed by assembling a plurality of cross members in a ladder configuration between a pair of side rails.

BACKGROUND ART

Frames assembled in a ladder configuration and comprising steel material are used in medium-size and large-size vehicles. Springs, axles, the engine, a plurality of transmission devices, brake devices, body components and the like are mounted on such frames. Furthermore, air tanks, fuel tanks, batteries, electrical wires, conduits, and the like are also mounted.

In general, such frames are formed by mounting a plurality of steel cross members in a ladder configuration between a pair of steel side rails disposed in parallel with each other. The steel material of each of the pair of side rails is formed so as to have a U-shaped cross section, and the pair of side rails is assembled such that the open sides of the U-shaped cross sections thereof are mutually opposed.

In conventional manufacturing sequences for such vehicles, this ladder-configuration frame is assembled first of all using a pair of side rails and a plurality of cross members. Next, the assembled frame is introduced into a manufacturing line, and a variety of devices and components are mounted thereon. In well known and commonly used manufacturing-line formats, such frames are temporarily held on the manufacturing line in a vertically inverted condition, or in other words, upside-down. In this condition, front and rear springs, axles, and other suspension devices and components that will be disposed in the lower part of the completed vehicle are mounted first of all to form a chassis module. Next, this chassis module, to which a large number of heavy components have been assembled, is lifted in its entirety by a large crane, inverted vertically through rotation thereof by 180 degrees about an axis parallel with a longitudinal direction thereof, and returned to the manufacturing line by the crane. All subsequent steps are performed in a normal orientation without further inversion.

On the subsequent manufacturing line, springs, axles, air tanks, the engine, and transmission devices, etc. are mounted, and the cab and fuel tank, etc. are then mounted. In this type of work step, assisting devices such as cranes disposed along the processing line are used with the engine, transmission devices, and other heavy components, and the components and devices are disposed in the vicinity of the frame's specific mounting positions. The mounting of components such as tanks, conduit tubes, and wire harnesses used for electrical wiring is carried out manually by workers who remove each component or device from a provided component box, carry the component to the designated mounting position thereof, and while holding the component or device in one hand or adopting a similar posture, perform the necessary operations for mounting thereof on the frame.

This type of configuration of a vehicle manufacturing step constitutes a widely known technique and is, for example, described in detail in non-patent document 1 as defined herein below.

Non-patent document 1: Review of Automotive Engineering (Jidosha Gijutsu Handobukku) No. 4; Manufacturing, Quality, and Maintenance Edition, edited and released by Society of Automotive Engineers of Japan, Inc. released Sep. 1, 1991. In particular, see content of page 284 and thereabouts.

DISCLOSURE OF INVENTION

Problem to be Solved by the Invention

Work steps wherein cross members are assembled to a pair of side rails and then various components are mounted thereon have attracted attention as a result of the non-ergonomic operations included therein. That is to say, such work steps require workers to adopt unnatural postures. Typical examples thereof are operations carried out in a stooped posture, operations wherein the worker supports a heavy component in one hand while operating a fixing tool with the other hand, and wiring and piping operations wherein the worker must position himself or herself halfway beneath the frame. The inevitable increases in man-hours required for the step or in the time required to achieve proficiency caused by such working practices have become the focus of attention.

Certain vehicles such as trucks have a wide variety of different specifications, and in addition, requests for special specifications are often received from clients. As a result, the work steps currently performed for these vehicles frequently require that layout changes be carried out. If man-hours for each component step have been set to standard values, the switching of certain steps can be achieved easily upon layout change; however, if the manufacturing sequence includes steps with large man-hour values such as described above, it both becomes difficult to switch the corresponding work steps and unanticipated waste occurs as a result of the switchover. These factors inevitably force up the vehicle fabrication cost.

Furthermore, action taken to avoid work requiring unnatural postures under such manufacturing steps lead to restrictions being imposed on the available positions for component mounting, limiting the degree of freedom in both vehicle design and manufacturing step design.

The present invention was carried out under the above-described conditions, and an object of the present invention is to reduce the amount of man-hours required for vehicle assembly and to make such assembly operations more economic. It is a further object of the present invention to provide an operation format for assembly of chassis modules not requiring workers to adopt unnatural postures. It is a further object of the present invention to reduce or eliminate special steps requiring large amounts of man-hours, increasing the degree of freedom in work step switching. It is a further object of the present invention to provide a work step with few restrictions on the degree of design freedom as a result of component mounting operations.

In addition, it is a further object of the present invention to provide a tool or assisting device used to make assembly operations more economic. It is a further object of the present invention to provide an assisting device making feasible an operation format for assembly of chassis modules not requiring workers to adopt unnatural postures. It is a further object of the present invention to provide a novel assisting device used to increase the degree of freedom in work step switching by reducing or eliminating special steps requiring large amounts of man-hours. It is a further object of the present invention to provide a novel assisting device used in work steps in order to make feasible an operating format with few restrictions on the degree of design freedom as a result of component mounting operations.

Means for Solving Problem

The principal characteristic of the present invention relates to devices and components mounted on a pair of side rails that each constitute a longitudinal element of a frame, and specifically, is that some or all of the devices and components are mounted on the side rails before assembly of the side rails to form the frame. Although the term "some or all" is used above, it is preferable that steps be defined such that the maximum possible number of devices and components can be mounted on the side rails in a step before assembly of the frame.

In the step before assembly of the frame, mounting of various devices and components is carried out with each of the pair of side rails disposed such that the open side of the U-shaped cross section thereof is oriented upward. In this way, devices and components mounted at the bottom of conventional vehicles can be assembled by accessing the pair of side rails from the left or right thereof.

When these mounting operations have been advanced considerably, each of the side frames is rotated by approximately 90 degrees about a longitudinal axis thereof. At this time, the side rails are rotated such that the open sides of each U-shaped cross section thereof become mutually opposed. The interval between the pair of side rails is then adjusted, and cross members are mounted on the side rails to form a frame. Subsequently, conduits, wires, and other components straddling the side rails via the cross members are mounted.

In other words, according to a first embodiment of the present invention, a method for manufacturing a vehicle including an element wherein a plurality of components are mounted on a frame formed by assembling a plurality of cross members in a ladder configuration between a pair of side rails disposed in parallel with each other has a step of mounting some or all of the plurality of components on the side rails before assembly of the cross members to the pair of side rails.

It is preferable that the step of mounting some or all of the plurality of components on the side rails be performed in a condition where each of the pair of side rails, having a U-shaped cross section, is disposed such that an open side of the U-shaped cross section thereof is oriented upward. After this step performed in a condition where each of the pair of side rails, having a U-shaped cross section, is disposed such that an open side of the U-shaped cross section thereof is oriented upward, a step of rotating each of the pair of side rails about a longitudinal axis thereof such that the open sides of the U-shaped cross sections thereof become mutually opposed may be provided.

It is preferable that the step of mounting some or all of the plurality of components on the side rails be performed such that a height of the side rails above a floor surface (that is, a working surface plate, etc.) is equal to a height between the waist and the chest of a person standing on the floor surface.

A second embodiment of the present invention provides an assembly assisting device used in the manufacturing method of the first embodiment, the device having a working surface plate and at least one pair of side rail holding stands each holding one of a pair of side rails, setup on the working surface plate as members for assembly, close to one of the ends thereof; wherein the side rail holding stand includes a means for rotating whereby each of the side rail holding stands rotates the side rail held thereby about an axis parallel with a longitudinal direction of the side rail by a prescribed angle $\square$, and a means for controlling the rotation of the rotating means.

It is preferable that the pair of side rail holding stands be configured so as to be capable of changing the interval therebetween on the working surface plate, and that the pair of side rail holding stands includes a means for indicating a position thereof on the working surface plate.

According to an aspect of the present invention, the prescribed angle $\square$ is approximately 90 degrees; furthermore, the rotating means may be configured such that the pair of side rail holding stands can dispose the side rails held thereby with the open sides of each of the side rails oriented upward and with the open sides of each of the side rails mutually opposed.

The hydraulic means may be configured so as to be controlled hydraulically. It is preferable that the side rail holding stands be configured such that a height above the working surface plate of each of the side rails held thereby is approximately equal to a height between the waist and the chest of a worker standing on the working surface plate.

Effects of the Invention

Experimental results have shown that the working posture of workers can be dramatically improved in accordance with the present invention. Consequently, operating efficiency has been improved and overall man-hours have been substantially reduced. The degree of fatigue of workers involved in this step has been markedly reduced. The present invention has made it possible for the working time required for individual steps to be defined with a greater degree of resolution, making it easier to perform layout changes when orders for special specifications are received.

As an incidental benefit of putting the present invention into practice, the operation of inverting the chassis module on the manufacturing line, as is conventionally carried out early within the vehicle assembly step, becomes unnecessary. As a result, it is expected that cranes required for lifting of the chassis module, large mechanical devices required for vertically inverting the chassis module about a horizontal axis, and the corresponding control equipment will become no longer necessary.

BRIEF DESCRIPTION OF DRAWINGS

FIG. 1(a) is a plan view thereof, and FIG. 1(b) is a rear elevation thereof.

DESCRIPTION OF REFERENCE NUMERALS

Figure 1:
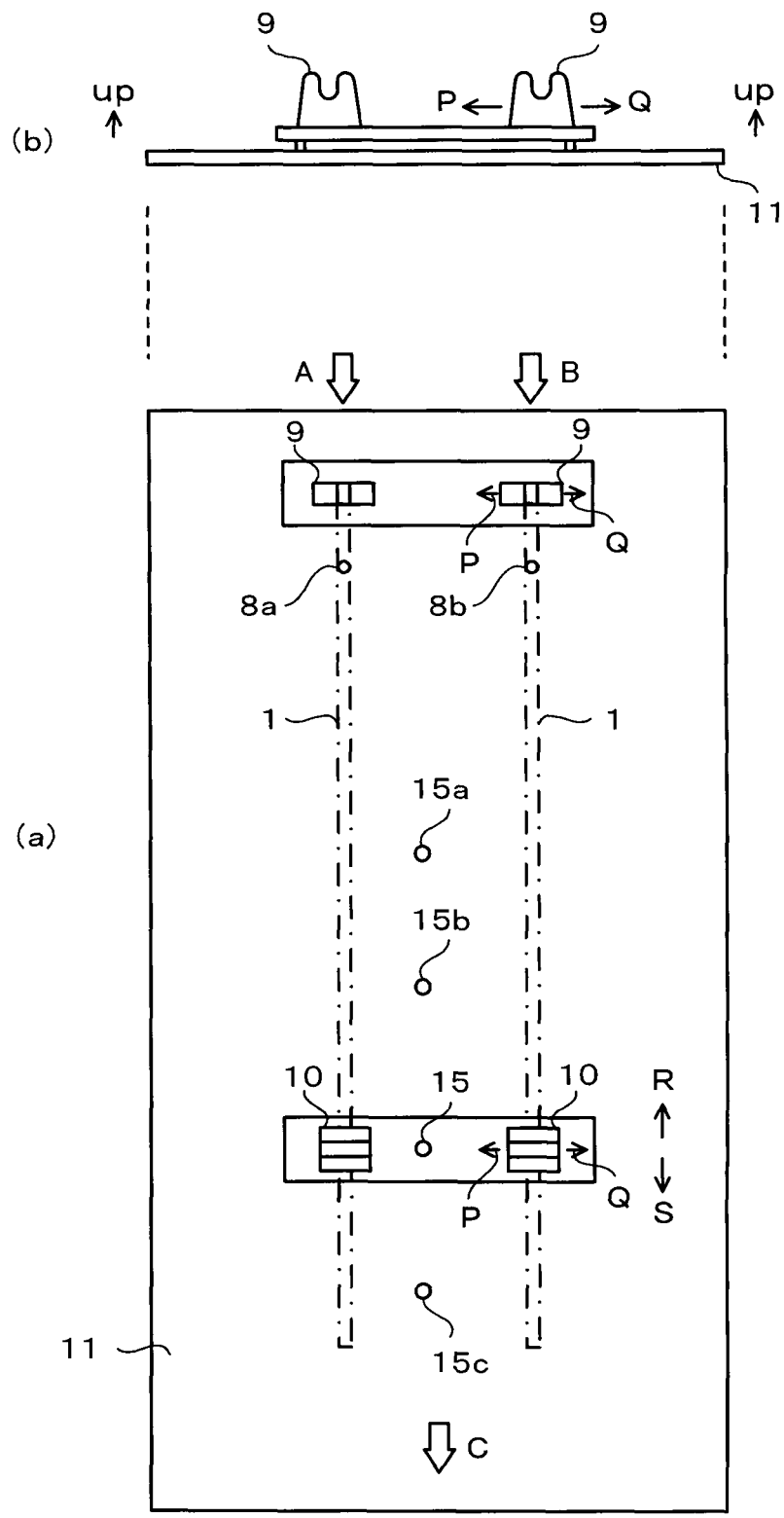
FIG. 1 is a diagram illustrating a working surface plate according to an embodiment of the present invention.

1 side rail
2 cross member 3 frame
4 tanks and other relatively heavy component
8a, 8b small opening
9 mount
10 side rail holding stand
11 working surface plate
12 stand
13 rotation jig
14 hydraulic cylinder
15 pin
15a, 15b, 15c pin opening
16 pusher

BEST MODE FOR CARRYING OUT THE INVENTION

The overall configuration of a step according to a preferred embodiment of the present invention is described first of all. FIG. 1(a) is a plan view illustrating a working surface plate whereupon the work step is performed, and FIG. 1(b) is a rear elevation thereof. A pair of side rails 1 is conveyed onto working surface plate 11 from the positions indicated by Arrow A and Arrow B. Each of the pair of side rails 1 comprises long and thin steel material formed so as to have a U-shaped cross section. The steel material is cut in advance to form side rails of a required length corresponding to the type of vehicle to be manufactured. In addition, openings for bolts are formed by machining at prescribed positions in order to facilitate mounting of components and assembly of cross members (not shown) subsequently attached, and anti-rust coating as necessary is administered.

This pair of side rails 1 conveyed onto working surface plate 11 is placed and held on a pair of mounts 9 and a pair of side rail holding stands 10. As described above, each of this pair of side rails 1 has a U-shaped cross section, and at this time, the pair of side rails 1 is conveyed with the open side of each U-shaped cross section thereof oriented upward with respect to working surface plate 11.

As shown in FIG. 1(b), mounts 9 are each formed so as to have an approximately semi-circular shaped recess at the center of the top thereof, and mounts 9 are each configured such that one end of side rail 1 is supported within the recess thereof by a jig. At least one of the pair of mounts 9 is configured so as to be capable of lateral motion with respect to working surface plate 11 as shown by Arrow P and Arrow Q. In this way, the interval between the pair of side rails 1 can be adjusted corresponding to the various types of vehicles that can be manufactured.

The pair of side rail holding stands 10 constitutes a feature of the present invention and is described in detail herein below. At least one of the pair of side rail holding stands 10 can also move laterally with respect to working surface plate 11 as shown by Arrow P and Arrow Q. In this way, the pair of side rails 1 is maintained in a supported condition above working surface plate 11 with both of the side rails positioned in mutual parallel. It should be noted that although side rail holders 10 should normally be visible far behind mounts 9 in the rear elevation of FIG. 1(b), side rail holding stands 10 have been omitted from this view for the sake of clarity. Arrow C shown at the bottom of FIG. 1(a) indicates the direction in which a chassis module whereupon components have been mounted will be conveyed to the next step after completion of the work step on working surface plate 11.

Figure 2:
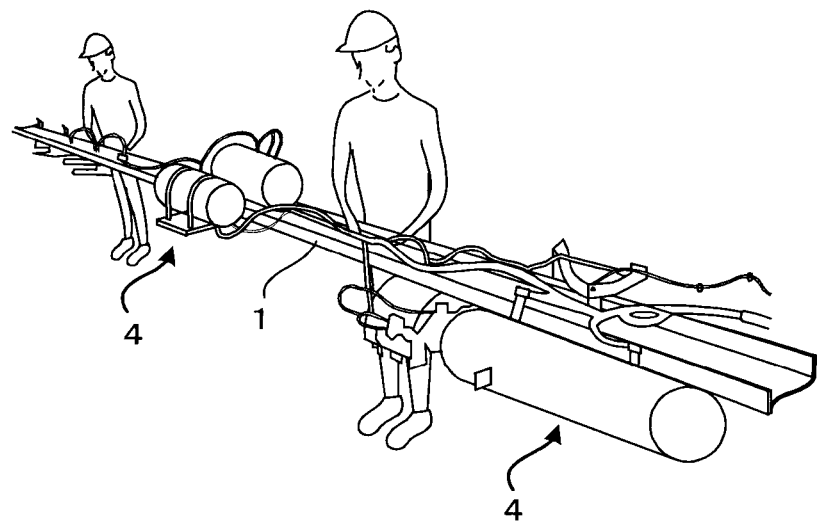
FIG. 2 is a perspective view showing a working format according to an embodiment of the present invention (condition of a side rail).

FIG. 2 is a perspective view of a workplace corresponding to a step according to an embodiment of the present invention. In a work sequence according to the present invention, each side rail 1 is individually disposed on a work surface before assembly of the cross members thereto, and the necessary components are mounted on the side rails. At this time, each side rail 1 is disposed on the work surface such that the open side of the U-shaped cross section thereof is oriented upward. It should be noted that devices for supporting side rails 1 have been omitted from FIG. 2. Tanks 4 and other relatively heavy components can be conveyed to the vicinity of each side rail 1 from the top, left, or right thereof and then mounted on the side rail. Furthermore, workers can work on various wires and conduits provided inside the U-shaped cross section of each side rail 1 from above the side rail. Where necessary, the workers may mount components from both the left and right of side rails 1.

This mounting work is executed individually for each of left and right side rails 1. At this time, heavy components may be mounted in a state wherein the weight thereof is supported by a work trolley or a small crane, etc.

After the mounting of heavy components, wires, and conduits, etc. individually on each of the pair of side rails 1, cross members 2 are assembled to the pair of side rails 1 to form frame 3. That is to say, at the point of assembly of side rails 1 and cross members 2 to form frame 3, appropriate components are already mounted on frame 3.

Figure 3:
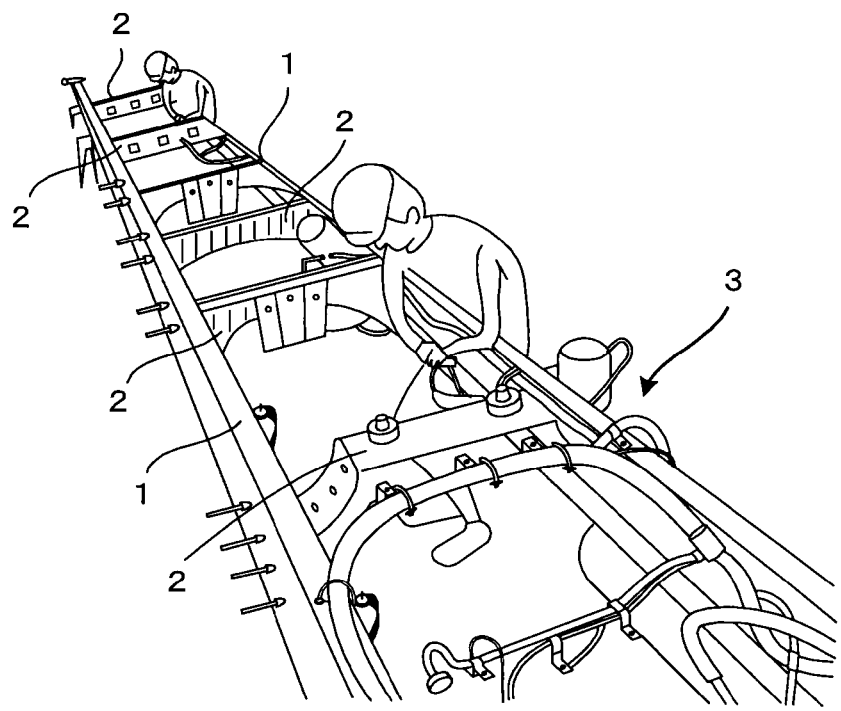
FIG. 3 is a perspective view showing a working format according to an embodiment of the present invention (condition of a frame).

FIG. 3 shows a condition where a plurality of cross members 2 have been assembled to a pair of side rails 1. At this stage, conduits and wires disposed so as to straddle the pair of side rails 1 are mutually connected. The mounting of drive components such as the engine and the mounting of axles and wheels, etc. are carried out during one or more subsequent steps.

Figure 4:
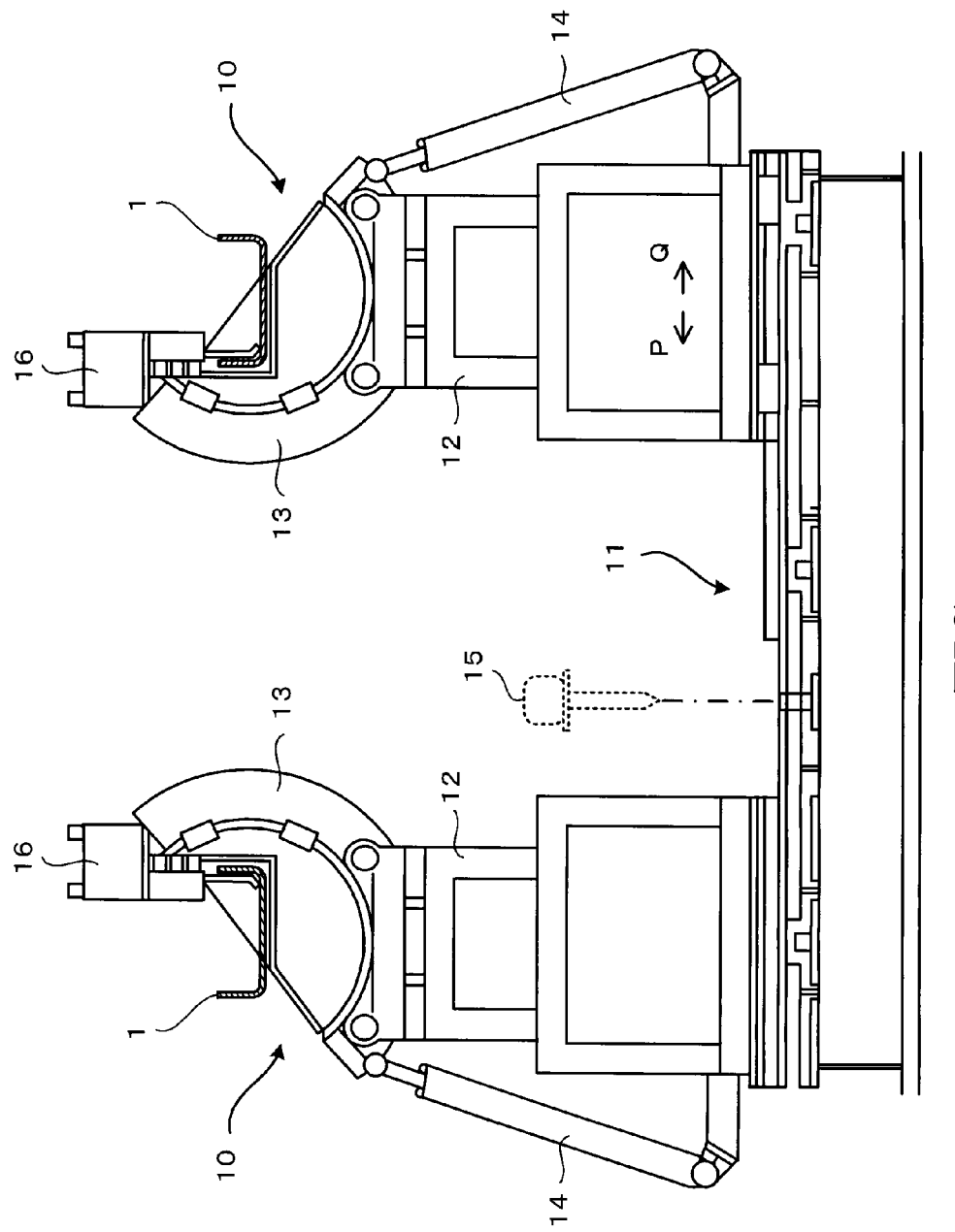
FIG. 4 is a front elevation showing a working surface plate according to an embodiment of the present invention (condition of side rails).

A holding device for the side rails as used in this step is now described. FIG. 4 is a front elevation showing a pair of side rail holding stands 10 according to an embodiment of the present invention. This view shows side rail holding stands 10 as seen from the position indicated by Arrow C of FIG. 1 and in the opposite direction to that of Arrow C. The holding device holds each of the pair of side rails 1 at a point close to an end thereof. A pair of side rail holding stands 10 is disposed upon working surface plate 11 that is disposed approximately horizontally on the floor of the plant. Each of the pair of side rail holding stands 10 firmly holds respective long and thin side rail 1 at a point close to an end thereof. Side rails 1 are indicated in FIG. 4 by way of hatched cross sections thereof. In the condition shown in FIG. 4, the pair of side rails 1 has been conveyed to the working surface plate, and each of side rails 1 is held with the open side of the U-shaped cross section thereof oriented upward.

In the sequence of attaching side rails 1 to side rail holding stands 10, side rails 1 are lowered by a small crane, and assisted manually by a worker, are placed and held at the positions shown by the dotted and dashed lines in FIG. 1. A plurality of rotation jigs 13 formed using semicircular plate-like members are provided at the upper end of side rail holding stands 10, and rectangular shaped cutouts are formed in rotation jigs 13. Side rails 1 are disposed with the outer surfaces thereof inserted along the cutouts. The worker then operates a valve (not shown) to apply hydraulic pressure to pushers 16. This action secures an end of side rail 1 to rotation jig 13. The same operation is executed sequentially by the pair of side rail holding stands 10 shown in FIG. 4.

The size of side rail holding stands 10 according to this embodiment is approximately such that the height of side rails 1, gripped by the device and constituting workpieces, coincides approximately with the height of the waist of a worker standing on working surface plate 11. That is to say, workers can access each of side rails 1 held close to an end thereof by the pair of side rail holding stands 10 in the condition shown in FIG. 2.

Arrow P and Arrow Q of FIG. 4 indicate the directions in which right side rail holding stand 10 can move laterally with respect to working surface plate 11. A pair of stands 12 can therefore be moved away from each other or towards each other. By moving stands 12 away from each other, appropriate space required for execution of operations on working surface plate 11 can be made available. In such a condition, various devices, components, wires, conduits, etc. can be mounted on the side rail 1 on the right of FIG. 4. In a similar way, various devices, components, wires, conduits, etc. can be mounted on side rail 1 shown on the left of FIG. 4

When the prescribed mounting work has been completed on the pair of side rails 1, hydraulic pressure is supplied to hydraulic cylinders 14 as a result of an operation of a worker, and as a result, rotation jigs 13 are each rotated through 90 degrees. Positions following rotation are shown in FIG. 5.

In a condition where side rail holding stands 10 have been rotated and the open sides of each of side rails 1 are in mutual opposition, the plurality of cross members 2 shown in FIG. 2 are assembled in a bridging condition between the pair of side rails 1, forming frame 3. Alternatively, in a condition where the open sides of side rails 1 remain oriented upward, cross members 2 are mounted to one of side rails 1, and side rail holding stands 10 are rotated. Mount 9 and side rail holding stand 10 can move freely in the directions shown by Arrow P and Arrow Q of FIG. 1 at this time, and mount 9 and side rail holding stand 10 are moved to the required assembly positions for assembly of cross members 2 in a bridging condition. As shown in FIG. 3, conduits and wires disposed so as to straddle the pair of side rails 1 are mutually connected. When these mutual connection operations have been completed, the workpiece is conveyed to the next step and mounting operations for the engine and body etc. can be executed.

Figure 5:
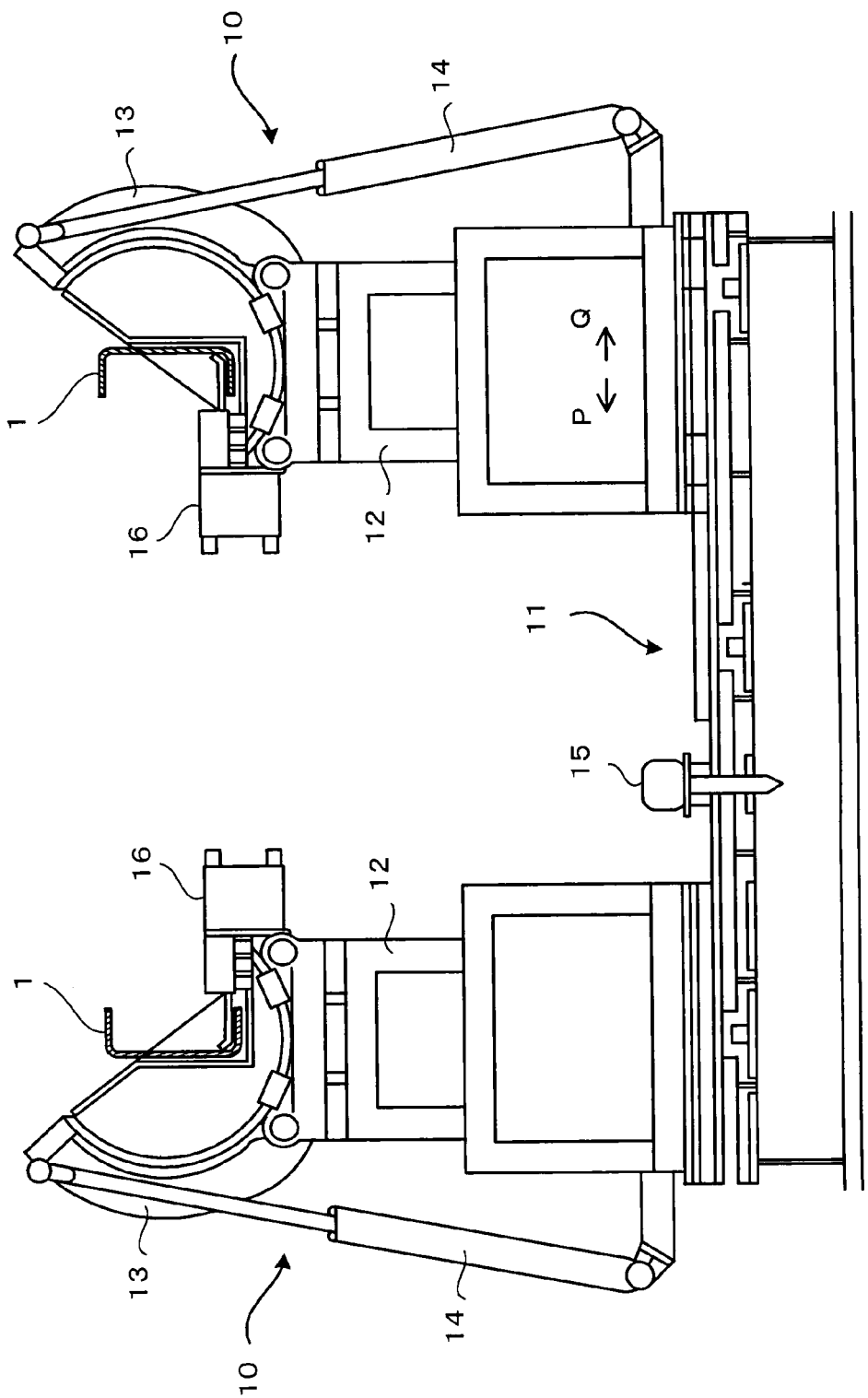
FIG. 5 is a front elevation showing a working surface plate according to an embodiment of the present invention (condition of a frame).

When all required work has been completed on working surface plate 11, in the condition shown in FIG. 5, an operation is executed to release the hydraulic pressure of pushers 16. Next, completed frame 3 is lifted by a crane. Frame 3, on which the required work has been completed, is conveyed from working surface plate 11 to the next step in the direction shown by Arrow C of FIG. 1.

Pin 15 and an action of the same are described hereinafter. Referring again to FIG. 1, the pair of side rail holding stands 10 can be moved on working surface plate 11 in the directions shown by Arrow R and Arrow S (that is, can be moved longitudinally). In the same way as described above, one of the pair of side rail holding stands 10 can be moved in the directions shown by Arrow P and Arrow Q (that is, can be moved laterally). This configuration both makes it possible for single working surface plate 11 to be used as standard with various vehicle types having side rails 1 of differing lengths and differing intervals therebetween, and to move each of the pair of side rails 1 to the precise required distances for assembly of the cross members in a bridging condition between the pair of side rails 1, tightening of bolts, and forming of frame 3. As shown in FIG. 1, pin openings 15a, 15b, 15c are provided at a plurality of locations on the surface of working surface plate 11. In order to provide for a plurality of specifications having differing lengths of pairs of side rails 1 (that is, lengths in the directions of Arrow R and Arrow S), pin 15 is inserted into a pin opening in working surface plate 11 in order to specify a holding position for the pair of side rails 1. That is to say, since a holding position for side rails 1 is specified as a result of the insertion of single pin 15 into one of the plurality of pin holes, operations for a plurality of vehicle types with different chassis module variations can be carried out in a convenient and accurate manner with no need for complicated adjustment. In other words, the position of side rail holding stands 10 on working surface plate 11 can be indicated in accordance with the specific side rail specification differing depending on the vehicle type.

An operation and a device for setting a pair of side rails in a parallel condition of a prescribed precision is described herein below. When assembling cross members 2 to the pair of side rails 1, held above working surface plate 11, side rails 1 must be disposed correctly in parallel with each other at a prescribed interval and with a prescribed precision. A structure and operating procedure for this purpose is described hereinafter.

Side rails 1 are provided in advance with small gauge openings 8a, 8b at prescribed positions on a side surface close to the ends thereof in order to facilitate position alignment such that deviation of positions does not occur therebetween. The small gauge openings in accordance with this embodiment of the present invention are each formed on the bent over portion on the bottom side of the side rail that will oppose the road surface in the completed vehicle condition. Although the small openings are indicated by relatively large circles in FIG. 1 for ease of understanding, it is sufficient that the actual diameter thereof be of the order of several millimeters in order that the strength of the side rails is not affected thereby.

Upon the assembly of cross members 2 to the pair of side rails 1, both ends of a gauge are inserted into small openings 8a, 8b and the positions of side rails 1 are aligned. A raising device that moves alignment pins up and down is provided on working surface plate 11 above which the pair of side rails 1 is held as a position alignment gauge, and alignment is carried out by inserting an end of the pins into the small openings 8a, 8b. Accordingly, assembly of the cross members while there remains a positional deviation between the pair of side rails 1 is prevented.

Although FIG. 1 shows only one pair of side rail holding stands 10, in the case of vehicles having long side rails 1, an embodiment of the present invention may be configured such that an additional pair of side rail holding stands is disposed at a suitable distance between the first pair of side rail holding stands 10 and mounts 9 in order to appropriately hold side rails 1. This measure is taken to prevent deflection of side rails 1 upon the mounting thereon of heavy items before assembly of cross members 2. Furthermore, although FIG. 1 and the corresponding description indicate a configuration wherein side rail holding stands 10 are disposed at only one end of side rails 1, an embodiment of the present invention may be configured such that side rail holding stands 10 are also disposed at the other ends of side rails 1 instead of mounts 9.

Optimization to ensure that the ends of side rails 1 to which cross members have not been assembled can be appropriately placed and held on mounts 9 is described hereinafter. As shown in FIG. 1(b), a recess is provided at the top of each of mounts 9. An end of side rail 1 is placed into this recess and held therein. Furthermore, when side rail holding stands 10 rotate each of the pair of side rails 1 by approximately 90 degrees about a longitudinal axis of the side rail, the end of the side rail rotates by approximately 90 degrees within the recess. It can be difficult to form a recess of an appropriate shape to allow this operation to be carried out successfully with side rails of various different sizes. Accordingly, we experimented with the use at the end of side rails 1 of jigs such as sockets or caps with one end thereof formed into a rod shape so as to rotate freely within the recess in mount 9, and with the other end thereof configured so as to hold the end of side rail 1. One end of the jig is formed with a rod shape to facilitate free rotation of side rail 1 within the recess provided in mount 9, and the other end of the jig is configured so as to grip and hold the end of side rail 1. This jig may be formed into a wide range of shapes in order to match the shape of the end of side rail 1 and the shape of the recess at the top of mount 9. When such jigs are used, the jigs are removed when cross members 2 have been assembled to side rails 1, forming frame 3, and the chassis module is being conveyed from working surface plate 11 to the next step. Such jigs can be put to repeated use in this step.

INDUSTRIAL APPLICABILITY

The present invention can be put into practice in all vehicles using frames, such as trucks, busses, large passenger vehicles, and special motor vehicles. Specifically, the present invention can be used as one element of a well known manufacturing line. In doing so, the above-described effect will be achieved. Furthermore, an embodiment of the present invention can be introduced into a radial vehicle manufacturing device described in International Application No.: PCT/JP2004/003135, associated with the patent applicant's previous application, and put into practice in a frame preparation step.

The invention claimed is:

1. A manufacturing method for a vehicle comprising a frame formed by assembling a plurality of cross members in a ladder configuration between a pair of side rails disposed in parallel with each other, and a plurality of components, including springs, axles, an engine, a plurality of transmission devices, brake devices, air tanks, fuel tanks, batteries, electrical wires and conduits mounted on the frame, the method comprising:
    a first step of mounting at least a part of the plurality of components to the side rails before assembly of the cross members to the side rails, said part of the plurality of components being capable of being mounted to the side rails before the side rails and the cross members are assembled; and
    a second step of disposing the side rails with said at least a part of the plurality of components mounted thereon in parallel, and assembling the cross members to the side rails.

2. The manufacturing method for a vehicle of claim 1, wherein each of the side rails has a U-shaped cross section, and wherein the second step of is performed in a condition where each side rail is disposed such that an open side of the U-shaped cross section thereof is oriented upward.

3. The manufacturing method for a vehicle of claim 2, wherein the first step is performed in a condition where the side rails are disposed in parallel and the second step comprises a step of rotating each side rail about a longitudinal axis thereof such that the open sides of the U-shaped cross sections of the side rail pair become mutually opposed.

4. The manufacturing method for a vehicle of claim 2; wherein the first and second steps are performed such that a height of the side rails above a floor surface is equal to a height between the waist and the chest of a person standing on the floor surface.

* * * * *